Nov. 3, 1953      C. V. WOLFE      2,657,720
SAW WITH PLANER TOOTH
Filed July 9, 1949      3 Sheets-Sheet 1
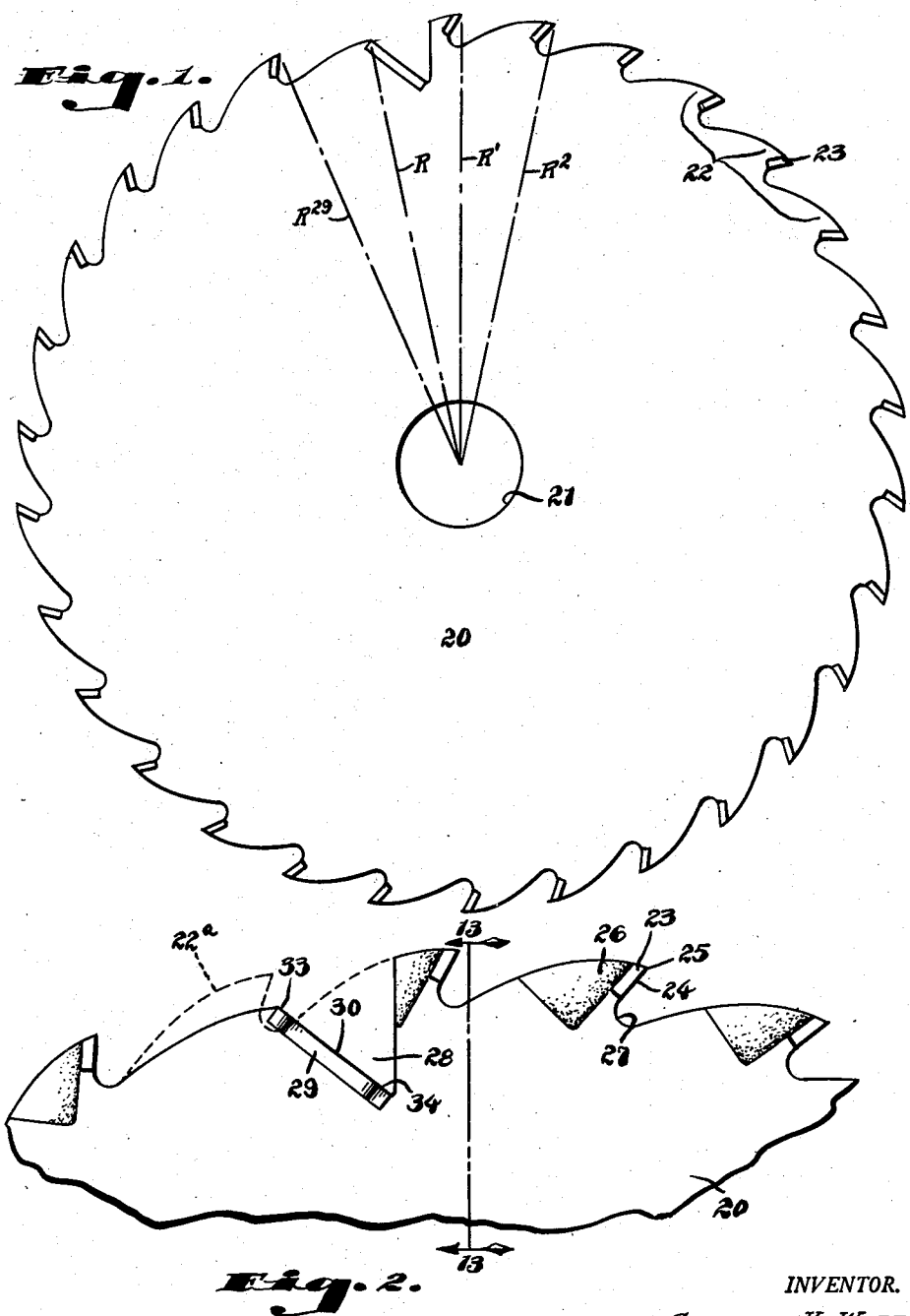
INVENTOR.
CHARLES V. WOLFE,
BY: *Harold B. Hood*
ATTORNEY.

Nov. 3, 1953                     C. V. WOLFE                    2,657,720
                             SAW WITH PLANER TOOTH
Filed July 9, 1949                                           3 Sheets-Sheet 2
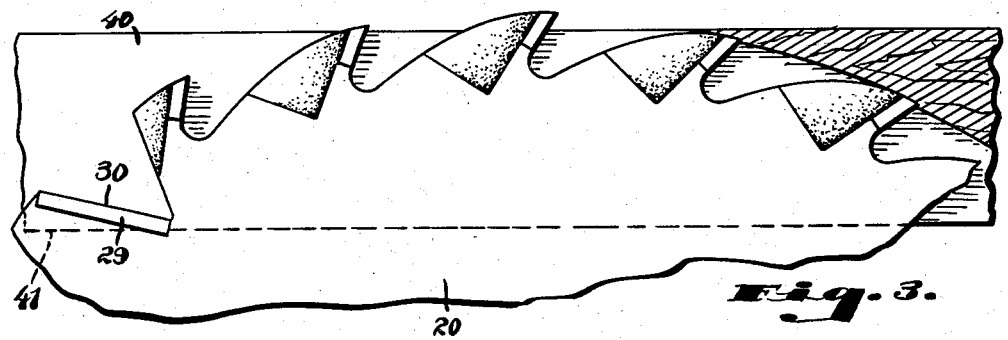
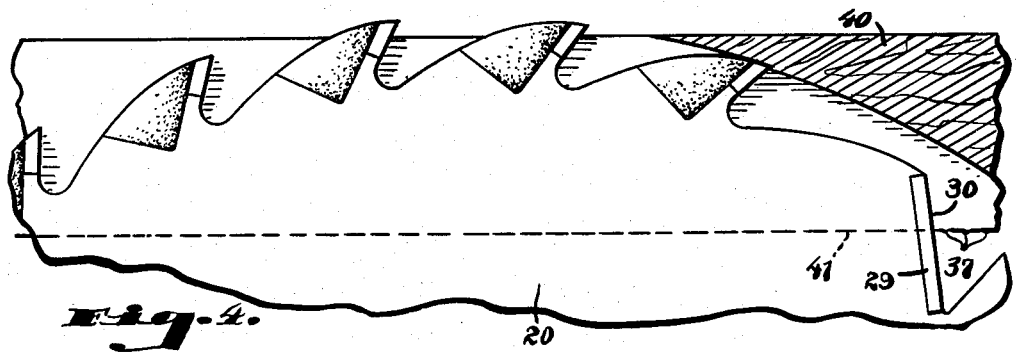
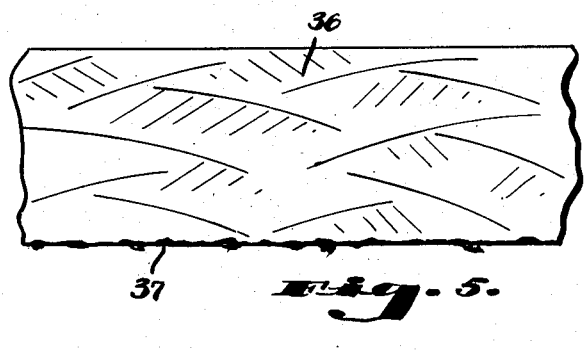
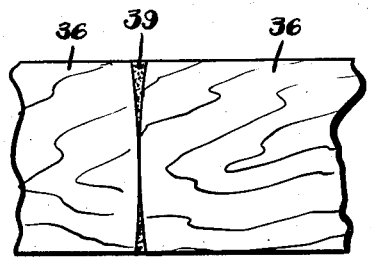
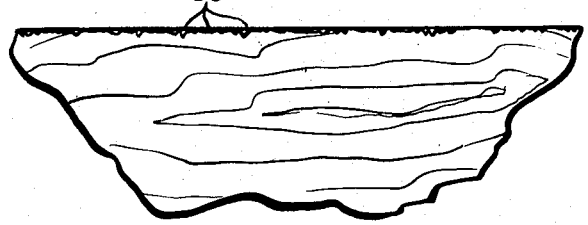
INVENTOR.
CHARLES V. WOLFE,
BY:
Harold B. Hood.
ATTORNEY.

Nov. 3, 1953                C. V. WOLFE                2,657,720
                        SAW WITH PLANER TOOTH
Filed July 9, 1949                              3 Sheets-Sheet 3

INVENTOR.
CHARLES V. WOLFE,
BY: Harold B. Hood.
ATTORNEY.

Patented Nov. 3, 1953

2,657,720

UNITED STATES PATENT OFFICE 2,657,720

SAW WITH PLANER TOOTH

Charles V. Wolfe, Indianapolis, Ind., assignor, by mesne assignments, to Borg-Warner Corporation, Chicago, Ill., a corporation of Illinois Application July 9, 1949, Serial No. 103,795

1 Claim. (Cl. 143—140)

The present invention relates to saws, and primarily to power-driven saws provided with teeth arranged in an endless series. The invention has its chief applicability in rotary saws, and it has been illustrated, and will be described, in that embodiment.

Within recent years, the use of inserted tip teeth in rotary saws has become prevalent, primarily because of the relatively long life of such saws between sharpening operations. In such saws, the transverse dimensions of the inset teeth or tips somewhat exceed the thickness of the discoid body by which those insets are carried. The tips or insets are made of very hard material such as, for instance, "Carboloy," and absolute uniformity of dimensions and setting thereof upon the saw body are impossible of attainment. Consequently, the operation of such a saw inevitably produces scratches or scars upon the lateral surfaces of the kerfs cut thereby. It will be clear that any slight wobbling of the saw upon its axis will also produce scars in the lateral kerf surfaces.

According to standard practice, the leading face of each cutting tooth inclines radially outwardly in the direction of rotation of the saw; and a standard degree of such inclination, relative to a radius including the cutting tip of the tooth, is 30°. A tooth so set will emerge from the lower surface of work passing the saw, in an attitude substantially parallel with the work surface which it is leaving; and inevitably pieces will be torn out of the lower surface of the work immediately adjacent the lateral kerf walls, and splinters will be loosened in those regions, as the teeth so emerge. The production of such loosened splinters is referred to in the art as feathering.

Scarred cut surfaces will absorb undue quantities of glue when two such surfaces are to be adhesively joined. The breaking and feathering above referred to would, if unrectified, mar the appearance of articles produced from the cut lumber. Consequently, it is customary to smooth the cut edges by mechanical sanding. Such smoothing, of course, involves a separate operation with its consequent cost; and, as a practical matter, it is found that sanding will inevitably result in rounded or otherwise distorted surfaces which, of course, interfere with satisfactory joining operations.

It is the primary object of the present invention to produce a saw which, in operation, will make smooth cuts, resulting in square cut surfaces substantially without scratches or scars, and without breaking or feathering at the work surface from which the saw teeth emerge. A further object of the invention is to provide a saw which, although having a thinner body and narrower leading faces on its teeth than have heretofore been considered possible, will nevertheless produce the desired unmarred cut surfaces.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claim is not violated.

Fig. 1 is an elevation of a rotary saw constructed in accordance with my invention;

Fig. 2 is a fragmentary elevation of the same, drawn to an enlarged scale;

Fig. 3 is a view similar to Fig. 2 but showing my improved saw operating upon a piece of work, the planer tooth being shown in the attitude which it assumes just after entering the work;

Fig. 4 is a view similar to Fig. 3, the planer tooth being shown in the attitude which it assumes as it leaves the work;

Fig. 5 is a fragmentary elevation of the cut face of a piece of work produced by a conventional saw;

Fig. 6 is a fragmental bottom plan view of the piece shown in Fig. 5;

Fig. 7 is a fragmentary end elevation of two pieces of wood whose cut faces have been sanded and then joined by an adhesive;

Figure 13:
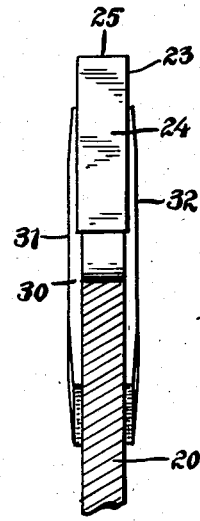
Fig. 13 is a fragmentary sectional view taken substantially on the line 13, 13 of Fig. 2, and drawn to an enlarged scale.

Referring more particularly to the drawings, it will be seen that I have illustrated a disc-like body 20 having a central perforation 21 adapted to be mounted upon a spindle for rotation, said body being provided with a peripherally arranged series of saw teeth 22, each of which is provided with an inset tip 23. Each tip 23, which will preferably be made of very hard material, such as sintered carbide, is formed to provide a leading face 24 having a transverse dimension somewhat greater than that of the body 20 (see Fig. 13) and terminating in a sharpened cutting end 25. Preferably, each tooth body is symmetrically relieved, as at 26, in the region behind the tip 23, and a gullet 27 is arranged in advance of each tip 23 in accordance with standard practice. The cutting end 25 of each tooth is disposed upon a radius of the saw body, the radii in which such ends are located being equi-angularly spaced, as at $R^1$, $R^2$—$R^{29}$. In the illustrated embodiment of the invention, such radii are angularly spaced apart by 12°.

According to conventional practice, the saw would be provided with a thirtieth tooth 22 whose cutting end would be disposed upon the radius R which is angularly midway between the radii $R^{29}$ and $R^1$. In my improved saw, that tooth (indicated in dotted lines at 22a in Fig 2) is omitted, and is replaced by a planer tooth 29 to be described.

The planer tooth 29 is formed to provide a leading face 30 laterally bounded by cutting edges 31 and 32, and preferably slightly tapered toward its opposite ends 33 and 34, the tapering lateral edges at the opposite ends of the face 30 merging smoothly with the edges 31 and 32, as at 35.

The radially outermost end 33 of the tooth 29 is located upon the radius R, but is spaced radially inwardly from the common circle in which lie the cutting ends 25 of the tooth tips 23. The face 30 of the tooth is inclined outwardly and away from the direction of rotation of the saw 20. Optimum results are attained when the inclination of the face 30 relative to the radius R is approximately 40°, and the inclination of each face 24 relative to its associated radius $R^1$, $R^2$, etc., is approximately 30°, the faces 24 and 30 being oppositely inclined relative to their respective associated radii.

Otherwise expressed, an optimum inclination of the face 30 is that which will cause the face 30 to assume, as it enters a piece of work 40, an attitude approximately parallel to the surface 41 of such work which the planer tooth is entering, as shown in Fig. 3; and to assume, as it leaves the work, an attitude approximately perpendicular to said surface 41 which it is leaving, as shown in Fig. 4.

The teeth 22, being conventional in construction and arrangement, will produce scratching upon the lateral kerf surfaces precisely in the manner shown on the work piece 36 illustrated in Fig. 5, and will produce feathering, as indicated at 37 in Fig. 5, and breaking or chipping as indicated at 38 in Fig. 6. As is clearly to be seen in Fig. 13, the face 24 of each tooth tip 23 extends symmetrically beyond the faces of the saw body 20; but the face 30 of the planer tooth 29 extends symmetrically beyond the planes ideally defined by the lateral edges of the faces 24 of all the teeth 22. Therefore, as the tooth 29 sweeps through the kerf, its lateral edges plane away the scratches and scars left by the teeth 22 to smooth the lateral kerf walls. Even as the tooth 29 enters the surface 41, it tends to chip off the feathers 37 and to smooth away the imperfections indicated at 38 and resulting from chipping and breaking produced by the teeth 22. As it leaves the surface 41, however, the tooth 29 is in such a position as to produce a shearing or slicing effect upon the lower edges of the kerf walls, smoothly cutting away the feathers produced by the teeth 22 and relieving the results of the chipping action of those teeth.

From a consideration of Figs. 5 and 6, it will be clear that the cut surfaces produced by a conventional saw are not adapted for adhesive connection because of their irregularities. It is customary, therefore, to smooth and dress those surfaces by sanding after the cutting operation and before the application of adhesive. It is found in practical operation that such sanding will inevitably result in distorted surfaces, usually rounded in the manner indicated in Fig. 7; whereby substantial quantities of excess adhesive must be used, as indicated at 39, in Fig. 7, in joining such surfaces.

Figure 8:
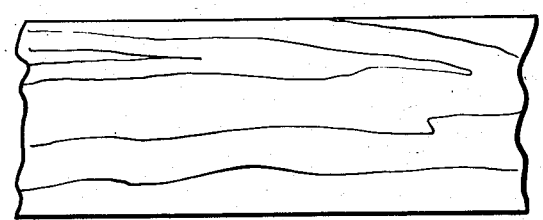
Fig. 8 is a view similar to Fig. 5 but showing the results of my improved saw.
Figure 10:
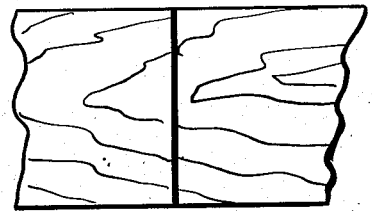
Fig. 10 is a view similar to Fig. 7 but showing the results of my improved saw.
Figure 9:
Fig. 9 is a view similar to Fig. 6 but showing the results of my improved saw.
Figure 12:
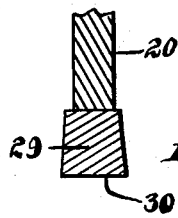
Fig. 12 is a section taken substantially on the line 12, 12 of Fig. 11.
Figure 11:
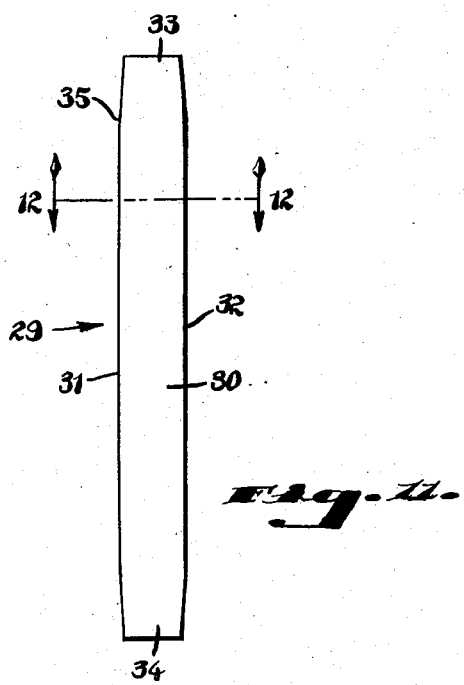
Fig. 11 is a front elevation of the leading face of an optimum form of planer tooth forming a part of my invention, drawn to an enlarged scale.

Since the cutting edges 31 and 32 of the tooth surface 30 are absolutely parallel to each other and lie in planes absolutely perpendicular to the saw axis, and since the operation of those edges produces smooth surfaces upon the kerf walls, it will be seen that smooth, square cut surfaces will be left on the work. Such a surface is shown in Fig. 8; and Fig. 10 is illustrative of the fact that two such surfaces, when joined, will be parallel throughout, whereby excesive adhesive will not be required.

The tapering of the ends of the tooth 29 eliminates any tendency for the corners of the face 30 to scratch the kerf wall surfaces.

The mass of the tooth 29 is, of course, considerably greater than the mass of one of the tooth tips 23, not only because the tooth must be wider than a tip, but also because the tooth must be longer than such a tip in order to perform its intended function. Although that mass is disposed at a point radially closer to the axis of the saw than is the mass of any tip 23, its dynamic effect upon the balance of the saw is greater than that of any tip 23. Consequently, in order that the balance of the saw may not be disturbed, I consider it desirable to form a notch 28 in the saw body by removing from the saw body a mass of material sufficient to compensate, in the balance of the saw, for the presence of the tooth 29. I presently believe that the particular shape and location of such notch, with relation to the position of the tooth 29, as illustrated, is optimum.

The concept of providing special teeth in a rotary saw in an effort to cure the undesirable effects of conventional teeth 22 with or without inset tips 23, has been suggested heretofore; but without substantial commercial success. So far as I am advised, that concept has always heretofore been embodied in a form involving the use of two or more such special teeth symmetrically located about the axis of the saw. Apparently, those who have heretofore worked in the field have deemed the use of a plurality of such teeth to be essential, perhaps because of considerations of saw balance.

I have found that, as a matter of fact, the end objectives cannot be satisfactorily attained if more than one planer tooth is included in a saw, partly, at least, for the reason that it is impossible to ensure the running of the corresponding cutting edges of a plurality of such teeth accurately in a common plane. Initial setting of such teeth with their opposite cutting edges in common parallel planes is commercially not feasible, partly because of the fact that absolute accuracy in the sizing of Carboloy pieces of the character of the tooth 29 is commercially impossible. Additionally, rotary saws, driven at high speed, will inevitably wobble, at least to a slight degree, and in at least some instances. A wobbling saw carrying a plurality of planer teeth will always produce gouging or other distortion of the kerf surfaces.

When a single tooth is used, on the other hand, the problem of uniformity of setting upon the saw body does not arise, and a slight wobbling of the saw, in operation, will not affect the accuracy of the cutting operation, since the single tooth will always be in the same position as it travels through the kerf, in spite of the wobble.

At least partly because of this fact, I have found, by actual production in a lumber mill, that the heretofore-accepted minimum body thickness for saws of the character here under consideration can be substantially reduced without detriment to the character of the cut surfaces. According to conventional practice prior to my invention, it has always been supposed that saw bodies of the character here under consideration must be at least 0.125" thick; and the lateral projection of the tooth tip faces on each side of the body faces has always been at least 0.020" to 0.025". Utilizing my invention, I have done commercial work entirely satisfactorily using a body thickness of 0.075", a conventional tooth width of 0.120", and a planer tooth width of 0.125". Thereby, I reduce the kerf from the conventional 0.165" to 0.175", to a new width of 0.125", thereby saving 0.050" of lumber on every cut.

Operating my saw at 3600 R. P. M., work can be fed past the saw at a rate of 150 feet per minute. A simple arithmetical calculation will demonstrate the fact that this reduction in kerf width alone will thus preserve three hundred board feet of lumber per day against conversion to sawdust, when working on one-inch stock. The improved action of the saw saves further lumber in eliminating the necessity for sanding, and additionally affects saving of the labor involved in the sanding operation.

Experiments indicate that it will be possible to reduce thicknesses still further to attain a commercially feasible kerf width of 0.10".

I presently believe that it will be possible, in view of the action of my planer tooth, to increase the angular spacing between the radii $R^1$, $R^2$—$R^{29}$, thereby reducing the total number of teeth in a saw, without detrimentally affecting the work. Experiments indicate that an increase in the length of the surface 30 will proportionately increase the feasible rate of work feed.

The improvements effected by the saw structure disclosed and claimed herein result largely, in my opinion, from my discovery of the fact that a single planer tooth, substituted in an otherwise continuous series of symmetrically spaced conventional cutting teeth, will act more effectively than will a plurality of planer teeth, symmetrically spaced about the axis of the saw.

I claim as my invention:

A circular saw comprising a discoid body, a series of cutting teeth spaced about the periphery of said body, each such tooth having a leading face having a transverse dimension greater than the thickness of said body and terminating in a sharpened end, said ends lying substantially in a common circle and the end of each tooth being located on one of a continuous series of equiangularly spaced radii, and a single planer tooth having a leading face having a transverse dimension greater than that of a cutting tooth and having its radially outermost end located radially inwardly from said common circle, said body being provided with an inwardly extending notch immediately in advance of the leading face of said planer tooth to balance such saw.

CHARLES V. WOLFE.

References Cited in the file of this patent

UNITED STATES PATENTS

| Number | Name | Date |
|---|---|---|
| 8,393 | Woolston | Sept. 30, 1851 |
| 31,073 | Brown | Jan. 8, 1861 |
| 102,286 | Littlepage | Apr. 26, 1870 |
| 449,005 | Slaughter | Mar. 24, 1891 |
| 505,154 | Bowles | Sept. 19, 1893 |
| 1,861,218 | Huther | May 31, 1932 |
| 2,071,618 | Ferrari | Feb. 23, 1937 |

FOREIGN PATENTS

| Number | Country | Date |
|---|---|---|
| 214,631 | Great Britain | July 31, 1924 |